(12) United States Patent
Korndoerfer (10) Patent No.: US 10,410,466 B2
(45) Date of Patent: Sep. 10, 2019

(54) AMUSEMENT MACHINE AND MONITORING SYSTEM

(71) Applicant: NOVOMATIC AG, Gumpoldskirchen (AT)

(72) Inventor: Jens Korndoerfer, Horrweiler (DE)

(73) Assignee: NOVOMATIC AG, Gumpoldskirchen (AT)

( * ) Notice: Subject to any disclaimer, the term of this patent is extended or adjusted under 35 U.S.C. 154(b) by 853 days.

(21) Appl. No.: 14/888,433

(22) PCT Filed: Apr. 17, 2014

(86) PCT No.: PCT/EP2014/057864
§ 371 (c)(1),
(2) Date: Oct. 31, 2015

(87) PCT Pub. No.: WO2014/177394
PCT Pub. Date: Nov. 6, 2014

(65) Prior Publication Data
US 2016/0078723 A1    Mar. 17, 2016

(30) Foreign Application Priority Data

May 2, 2013   (DE) .................. 10 2013 104 460

(51) Int. Cl.
*G07F 17/32*    (2006.01)
*H04B 10/114*   (2013.01)

(52) U.S. Cl.
CPC ...... *G07F 17/3241* (2013.01); *G07F 17/3209* (2013.01); *G07F 17/3211* (2013.01); *G07F 17/3234* (2013.01); *G07F 17/3244* (2013.01); *H04B 10/1141* (2013.01)

(58) Field of Classification Search
CPC ............ G07F 17/3211; G07F 17/3241; G07F 17/3234
See application file for complete search history.

(56) References Cited

U.S. PATENT DOCUMENTS

| 5,923,249 A * | 7/1999 | Muir ..................... G08B 13/06 273/138.1 |
| 9,070,264 B2 * | 6/2015 | Sivertsen ............. G08B 13/181 |
| 9,313,855 B1 * | 4/2016 | Sivertsen .......... H05B 33/0827 |
| 2003/0190958 A1 | 10/2003 | Paulsen |
| 2004/0053675 A1 * | 3/2004 | Nguyen ................. G07F 17/32 463/20 |

(Continued)

FOREIGN PATENT DOCUMENTS

JP    2012085943    5/2012

OTHER PUBLICATIONS

International Search Report for PCT/EP2014/057864, English Translation attached to original, Both completed by the European Patent Office on Jul. 22, 2014, All together 6 Pages.

*Primary Examiner* — Steven J Hylinski
(74) *Attorney, Agent, or Firm* — Brooks Kushman P.C.

(57) ABSTRACT

An amusement machine including a housing for receiving a computer-controlled game process control, connected to a display device for depicting the game process, which is connected to an actuator allocated to the housing for signaling information sent by the game process control. Wherein the signals of the actuator designed as an infrared light diode can be perceived by a monitoring device designed as a monitoring camera.

18 Claims, 3 Drawing Sheets

(56) References Cited

U.S. PATENT DOCUMENTS

| | | | |
|---|---|---|---|
| 2009/0082109 A1* | 3/2009 | Sepich | G07F 17/32 463/40 |
| 2009/0115133 A1* | 5/2009 | Kelly | G07F 17/32 273/274 |
| 2009/0143141 A1* | 6/2009 | Wells | G07F 17/32 463/37 |
| 2009/0197676 A1* | 8/2009 | Baerlocher | G07F 17/3202 463/30 |
| 2010/0130280 A1* | 5/2010 | Arezina | G07F 17/3206 463/20 |
| 2010/0255902 A1* | 10/2010 | Goldstein | G07F 17/32 463/29 |
| 2011/0128384 A1 | 6/2011 | Tiscareno et al. | |
| 2011/0195775 A1* | 8/2011 | Wells | G07F 9/026 463/29 |
| 2011/0263326 A1* | 10/2011 | Gagner | G07F 17/3211 463/34 |
| 2012/0231886 A1* | 9/2012 | Gomez | G07F 17/32 463/32 |
| 2013/0024952 A1* | 1/2013 | Sivertsen | G08B 13/08 726/34 |
| 2014/0094298 A1* | 4/2014 | Lyons | A63F 13/06 463/31 |
| 2014/0100030 A1* | 4/2014 | Burke | G07F 17/3204 463/31 |

\* cited by examiner

AMUSEMENT MACHINE AND MONITORING SYSTEM

CROSS-REFERENCE TO RELATED APPLICATION

This application is the U.S. national phase of PCT Application No. PCT/EP2014/057864 filed on Apr. 17, 2014, which claims priority to DE Patent Application No. 102013104460.3 filed on May 2, 2013, the disclosures of which are incorporated in their entirety by reference herein.

The invention relates to an amusement machine having an enclosure for accommodating a computer-controlled play control unit, which is connected to a display device for displaying the game play, and relates to a monitoring system comprising at least one amusement machine having a computer-controlled play control unit.

An infrared light emitting diode is known from the prior art and typically emits light in the near-infrared region at a wavelength of 700 nm to 1000 nm. This wavelength region of the light spectrum is invisible to the human eye but can be measured by radiation detectors made of pyroelectric materials or semiconductors, for instance by photodiodes or phototransistors. Digital cameras are also sensitive to infrared light in addition to visible light. Infrared light emitting diodes are typically used in infrared remote controls, for example for television or radio sets, in light curtains or in motion detectors.

It is also known to install security cameras in amusement arcades in order to watch the installed amusement machines or the players, in particular to prevent tampering with the amusement machines. The security cameras are connected to at least one screen in a service area so that the service personnel can operate unobserved by the players in the amusement arcade. It is also possible to incorporate amusement machines in a network of the amusement venues in order to retrieve information. Special security measures need to be taken in this case, however, to protect the network from unauthorized access.

It may be necessary in an amusement arcade for the service personnel to inspect the amusement machines regularly, for instance to establish whether a cash box needs emptying or a payout unit needs filling, in particular if the amusement machines are not connected to a service center via a computer network.

It is relatively time consuming both to monitor the amusement machines to prevent tampering and to inspect regularly the amusement machines, and in particular examining the amusement machine is off-putting for the players.

In the context of the invention, a coin is understood to mean not only a piece of money but also a token or other redeemable counter, chip or the like. Hence the coin collecting box is also intended not just for receiving coins but can also be filled with tokens, chips or other redeemable counters, which exist for example in an unsorted mix. In addition, the term banknote shall include not only such paper-based payment means but also vouchers/coupons or the like. Of course the amusement machine according to the invention can also accept bank cards, prepaid cards, payment cards or the like in addition to objects of monetary value in order to pay for a usage or to place the amusement machine in an intended operating state and/or to pay out winnings. It is also possible to register credit wirelessly, for instance, in particular by means of near field communication. In addition, the amusement machine can also comprise a known ticket system in which tickets that have been input are saved in a cassette, and tickets to be output are prepared by a printer, where the tickets that are output can be used again, for example, to pay at an amusement machine assigned to the ticket system.

A betting terminal or similar gaming machine, which does or does not include a chance of winning, shall be understood to be an amusement machine in the sense of the invention without departing from the scope of the invention.

The object of the invention is to provide an amusement machine of the type mentioned in the introduction which can be monitored by simple technical means without requiring extra installation effort.

This object is achieved according to the invention by the features of claim 1.

The dependent claims present advantageous embodiments of the invention.

An amusement machine comprises an enclosure for accommodating a computer-controlled play control unit, which is connected to a display device for displaying the game play and which is connected to at least one actuator allocated to the enclosure and intended for signaling information sent by the play control unit, wherein the signals from said actuator, which is embodied as an infrared light emitting diode, can be detected by a monitoring device in the form of a security camera.

The actuator embodied as an infrared light emitting diode is a light source that when driven appropriately emits a signal which is invisible to the human eye, can be detected by the monitoring device in the form of a security camera and either can be analyzed by said device or by a processor assigned thereto, i.e. a data processing unit, and/or can be discerned on a screen by service personnel and/or the installer of the amusement machine. The player operating or directly watching the amusement machine cannot discern either the actuator or the signals that it emits, and hence is not distracted by the signaling. The actuator can here communicate with alarm or surveillance systems normally installed in a casino. Thus no installation work is required at the location where the amusement machine is installed, i.e. is operated, nor is it possible for unauthorized third parties to penetrate the system, as is possible in a network for instance. The amusement machine communicates via the actuator only in an output direction and does not receive any information via the actuator. The actuator is arranged, for instance, on a front face or top face of the amusement machine. Of course it can also be mounted on a rear face. The essential aspect here is that the actuator is not obscured by people or objects in front of or around the amusement machine, and is located within the detection range of the security camera.

The infrared light emitting diode and the security camera largely involve known technology, where the infrared light emitting diode emits a light in a spectral region invisible to the human eye but which is visible to a standard security camera or more precisely can be detected by the chip thereof, and hence can be displayed on a screen. The active infrared light emitting diode is not visible to the player, i.e. to the human eye, and is not an annoyance when the amusement machine is being operated. Nonetheless, the casino supervisor or the service personnel at the installation location can perceive the active infrared light emitting diode on a screen installed in the service area. The security camera is a camera that is installed anyway so as to communicate with a recording unit and/or a screen for the purpose of monitoring the inside of the casino. The light signal from the infrared light emitting diode arranged on the front or top face of the enclosure of the amusement machine can be detected by the security camera usually mounted on a ceiling, and is not normally obscured by a player positioned in front of the amusement machine.

In order to be able to make complex information or a multiplicity of items of information or signals available to the security camera in a detectable form, a plurality of infrared light emitting diodes are advantageously arranged in an array and can be driven individually. Defined light patterns can hence be generated, for example in coded form, which can be interpreted by the service personnel. It is also possible to depict letters or the like. In order to design the depiction of alphanumeric characters or the like to be clearly detectable, at least one mask is assigned to the infrared light emitting diodes in order to provide a 7-segment display.

According to one development, the play control unit can drive at least one infrared light emitting diode to signal various machine states. A large amount of machine-specific information converges in the play control unit and is processed therein. Thus it is also possible to analyze the information here in order to notify the service personnel, if necessary, that a service or particular observation or action is required on the amusement machine. Use of an interface, for example, can also be detected by the play control unit and signaled by the infrared light emitting diode.

The at least one infrared light emitting diode advantageously indicates at least a maximum contents level or minimum contents level of a cash box and/or of a payout unit and/or a cluster of certain games and/or a defined keystroke and/or a specific touchscreen operation and/or a status of a money processing unit and/or a contents level of a ticket store and/or a contents level of a ticket printer and/or a fault with these units. For instance if the cash box or ticket store needs to be emptied or the payout unit or ticket printer needs to be filled, this is indicated and the service personnel can perform the relevant actions systematically. Tampering may be present when certain games occur in a cluster or when there is a defined keystroke, and on the basis of relevant information, the service personnel are able to watch the amusement machine particularly. If a relatively large number of coins or the like of the same denomination are fed to the money processing unit, tampering may be present, and the play control unit drives the infrared light emitting diodes accordingly in order to alert surveillance personnel to this situation. Likewise, a fault in units or components of the amusement machine can be signaled, for instance a paper jam in the ticket printer can be depicted by the infrared light emitting diode.

In the embodiment, a machine door is allocated a switch for detecting the closure state of the machine door, and/or the enclosure is allocated a vibration sensor, which switch and/or vibration sensor is connected to the play control unit, and the play control unit indicates a signal change by driving the at least one infrared light emitting diode suitably.

In order to depict encoded information, the at least one infrared light emitting diode can be driven such that coding is provided by the light intensity and/or light frequency of said light emitting diode. The light intensity and/or the light frequency, for instance flashing, can be detected by the security camera and decoded, for example by computer-controlled image analysis, in order to notify the service personnel of the state of the amusement machine.

The at least one infrared light emitting diode is advantageously mounted on the amusement machine such that it is concealed by a cover plate. Thus the infrared light emitting diode is mounted so that it is not visible. Of course the cover plate is transparent to infrared light.

In another embodiment, the at least one infrared light emitting diode is assigned to a mount that is fixed to the enclosure such that its orientation can be adjusted. The mount can be rotated and/or tilted with respect to the enclosure in order to orientate the infrared light emitting diode or the infrared light emitting diode array such that it lies in the receiving range of the security camera and is not obscured. The mount itself can be fixed to any point on the enclosure of the amusement machine.

A monitoring system comprises at least one amusement machine having an enclosure for accommodating a computer-controlled play control unit, which is connected to a display device for displaying the game play and which is connected to at least one actuator allocated to the enclosure and intended for signaling information sent by the play control unit, wherein the signals from said actuator, which is embodied as an infrared light emitting diode, can be detected by a monitoring device in the form of a security camera, and comprises a screen coupled to the security camera.

Of course a security camera, which in particular is pivotably arranged on a ceiling, can be used to monitor a plurality of amusement machines, wherein the one security camera or a plurality of security cameras are coupled to the screen, which is preferably connected to a processor, in particular to a data processing unit. There may also be a plurality of screens depending on the size of the monitoring system and the number of security cameras and/or amusement machines.

According to a development, the security camera and the screen are parts of a mobile device or are separate components. For instance the security camera and the screen may be parts of a smartphone or a tablet computer. Both mobile devices are equipped to receive the infrared light signals, to analyze said signals if applicable, and to display images relating to said signals. When the smartphone or tablet computer is used then the processor and input device thereof can also be used. Of course the security camera may be a separate capture device, and the screen may be a monitor or television screen connected to the security camera.

An image analysis unit preferably analyzes the image, which is detected by the security camera and transmitted to a processor, for the presence of a signal from the infrared light emitting diode, and when a signal is identified, the processor actuates an alarm unit that can be discerned by surveillance personnel. The image analysis unit detects and processes the signals from the infrared light emitting diodes, i.e. various patterns depicted by active infrared light emitting diodes or even light intensities or flashing rates. The alarm unit can generate a visually and/or acoustically discernible signal in order to alert the surveillance personnel to a certain machine state. The alarm unit can be coupled directly to the processor or can also communicate with the processor via a network, for example via the Internet.

A memory unit connected to the security camera and/or to the processor advantageously stores image data from the security camera. The various detected signals from the infrared light emitting diodes can hence be archived and analyzed at a later point in time, for instance if internal amusement-machine data gives cause to suspect a tampering attempt, for example, which can be traced or analyzed using the image data from the security camera. The memory unit may be an integral part of the camera or may be connected to the processor.

According to a development, in order to associate certain signaled events, which are indicated by the at least one infrared light emitting diode, relatively easily with the stored image data, the memory unit stores the image data with an allocated time stamp, wherein a timer is assigned to the security camera and/or to the processor. Such timers are often built into the electronic devices concerned. Using such timers it is possible to assign at least a date and time to the image data, for example in the form of a memory date or recording date, and/or to insert this information preferably permanently in the image.

The alarm unit is actuated and/or the image data is stored preferably on the basis of a change in the signal from the infrared light emitting diode, which change is ascertained by analysis means of the processor, said analysis means being in the form of a hardware circuit or a software module. The hardware circuit may be what is known as a Field Programmable Gate Array (FPGA) for example.

The alarm unit preferably comprises a personal information device. The information device may be in the form of a smartphone or the like, for instance, and can notify the service personnel of states of the amusement machine that are signaled by the infrared light emitting diode and analyzed by the image analysis unit.

It shall be understood that the features mentioned above and still to be explained below can be used not just in the particular combination stated but also in other combinations. The scope of the invention is defined only by the claims.

The invention is described in greater detail below using a number of exemplary embodiments with reference to the associated drawing, in which.

Figure 1:
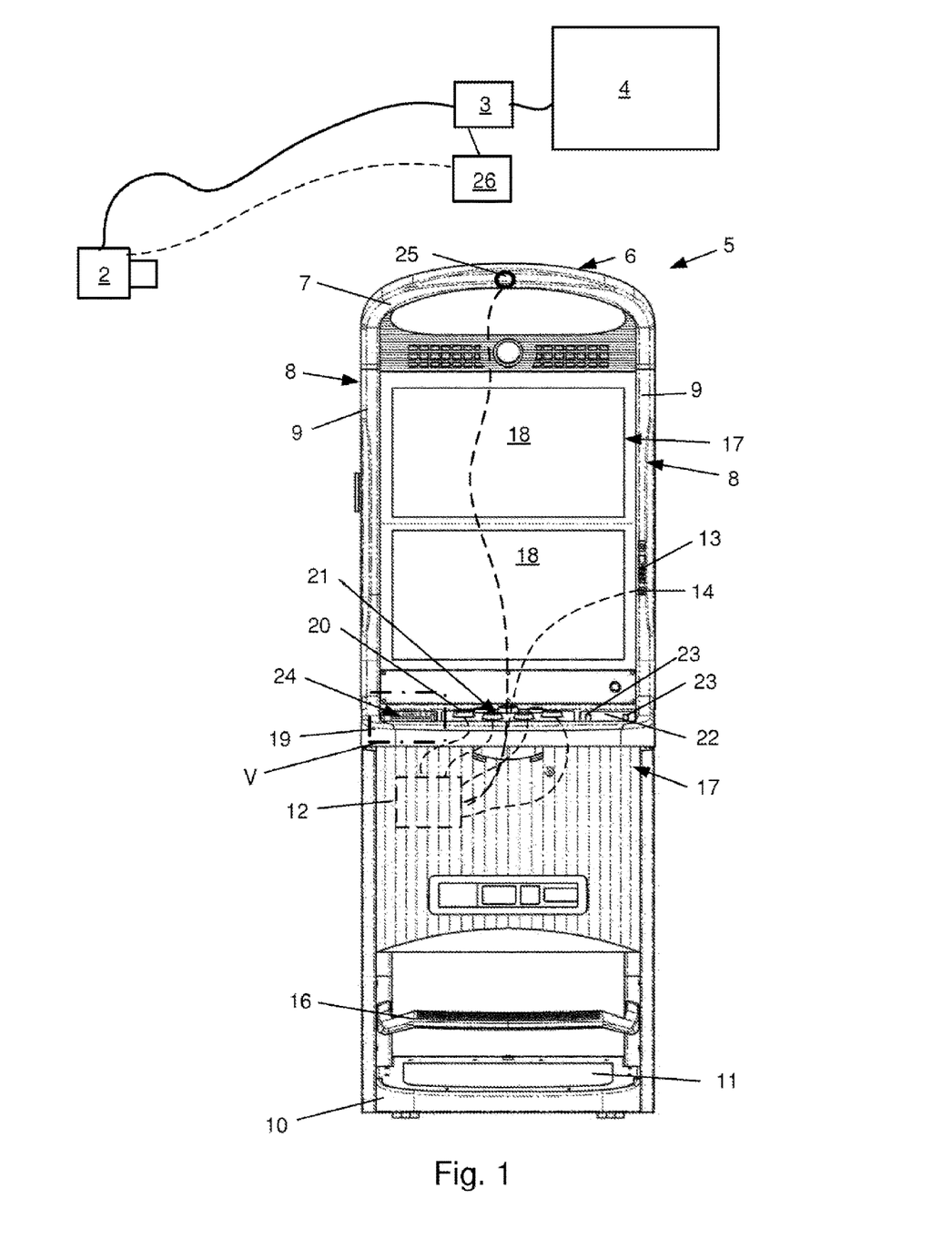
FIG. 1 is a simplified view of a monitoring system.

The monitoring system comprises an amusement machine 1, which is assigned a security camera 2 which is fitted in the building and connected to a screen 4 via a processor 3 of a data processing unit. A memory unit 26 is connected to the processor 3 or to the security camera 2 in order to store image data captured by the security camera 2.

The amusement machine 1 comprises a floor-standing enclosure 5 having a top head piece 6 comprising a frame piece 7, which is curved in this exemplary embodiment, two facing side walls 8, attached to the end faces of which are frames 9, and having a base 10 comprising a backlightable cover panel 11, and obviously a rear wall. The floor-standing enclosure 5 accommodates a play control unit 12, which is coupled to a money processing unit 27, said money processing unit 27 comprising a coin checker (not shown), a coin collecting box and a coin payout unit. The coin checker is connected via a coin chute situated behind the associated frame 9 to a coin slot 13 installed in the frame 9. A coin refund button 14 is located below the coin slot 13 in the frame 9 in order to pay out money in a known manner. A foot rest 16 is provided between the base 10 and a base plate 15 of the floor-standing enclosure 5 of the amusement machine 1, and in this exemplary embodiment extends across the entire width of the front of the floor-standing enclosure 5.

Two front covers 17 are hinged using suitable hinges such that they can swing in opposite directions in order to close the floor-standing enclosure 1. Two display devices 18, which are positioned one above the other in the top front cover 17, are connected to the play control unit and are used for displaying game content, game rules and/or other visible content. The display devices 18 can take any form required, in particular can be embodied as TFT displays and/or LED displays and/or OLED displays and/or plasma displays or the like. The closure status of the two front covers 17 can be detected by a switch 28 for identifying the closure state, said switch 28 being connected to the play control unit 12.

A console 19 is allocated to the bottom front cover 17. The console 19 contains a plurality of controls 21 in the form of pushbuttons 20, which are connected to the play control unit 12. To the side of the controls 21 are situated in the console 19 on one side a money output tray 22, which is operatively connected to the money processing unit 27 via slots 23 for coins when the bottom front cover 17 is in the closed state, and on the other side a banknote input/output tray 24, which comprises a note slot and, when the bottom front cover 17 is in the closed state, is coupled to a banknote processing unit situated in the floor-standing enclosure 5, wherein the banknote processing unit comprises, for instance, a banknote collecting box and/or a dispenser and is connected to the play control unit 12.

In addition and/or as an alternative to the banknote processing unit and/or a coin processing system, a ticket system (TITO) can be installed, which essentially comprises a ticket reader 33 for detecting any type of information printed on the ticket, for instance a barcode reader or QR-code reader, having a subsequent ticket store 34 and a ticket printer 35 for producing tickets for output. The ticket reader 33, the ticket store 34 and the ticket printer are connected to the play control unit 12 in order to process read data and to prepare data for printing a ticket to be produced and output.

At least one infrared light emitting diode 25 is fitted in the frame piece 7 of the floor-standing enclosure 5 of the amusement machine 1 and is coupled to the play control unit 12 in order to signal various states of the amusement machine 1 in a manner that is visible to the security camera 2 and invisible to the human eye.

The at least one infrared light emitting diode 25 is positioned at such a point of the amusement machine 1 that it is not obscured to the security camera 3 by a user or player and the infrared light emitting diode 25 is always located in the detection range of the security camera 3.

Figure 2:
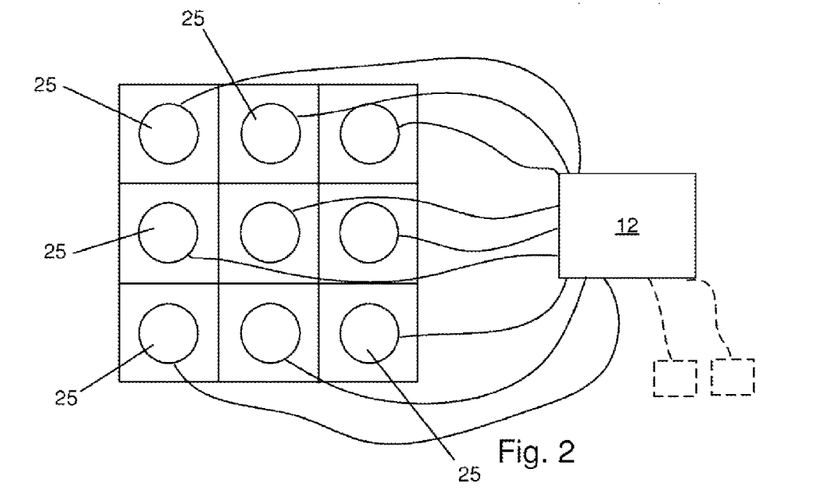
FIG. 2 is a simplified partial view of components of the monitoring system of FIG. 1.
Figure 3:
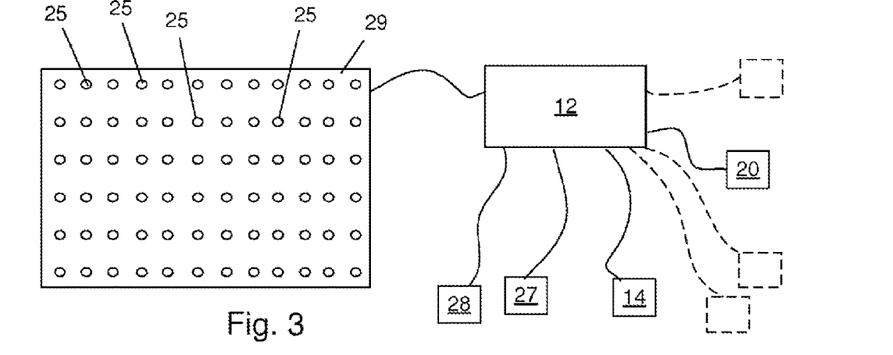
FIG. 3 is a view of the components of the monitoring system of FIG. 2 in an alternative embodiment.
Figure 4:
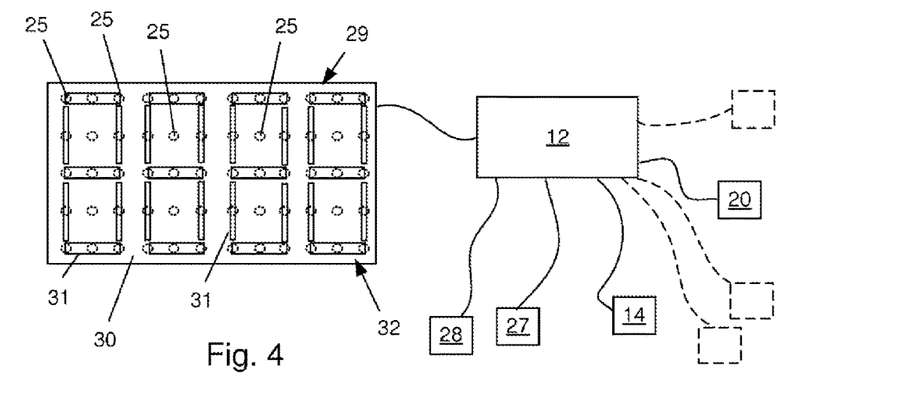
FIG. 4 is a view of the components of the monitoring system of FIG. 2 in another alternative embodiment.

The exemplary embodiment of FIG. 1 shows only a single infrared light emitting diode 25. Of course it is possible to arrange a plurality of infrared light emitting diodes 25, as is shown in FIGS. 2 to 4, for instance in columns and/or rows, in order to generate signals that can be depicted in a complex manner. The infrared light emitting diodes 25 can be driven individually by the play control unit 12, and can emit light of a different intensity or flash at any frequency. The infrared light emitting diodes 25 are installed here for example in the form of light points on a shared support 29, which can also comprise cooling fins or the like for instance. In addition, the support comprises the necessary current paths for driving the individual infrared light emitting diodes 25 and connections for connecting to the play control unit 12 installed inside the amusement machine 1.

The infrared light emitting diodes 25 arranged on the support 29 can be driven by the play control unit such that they emit light in any patterns required. The patterns may depict a code, which after being decoded, for instance by the service personnel watching the screen 4, provides information about certain machine states. The decoding can also be performed by an image analysis unit of the processor 3, and the information about the machine state depicted by the infrared light emitting diodes 25 and detected by the security camera 2 is displayed in plain text on the screen 4. The patterns may also be information in plain text, this being achieved by the play control unit 12 driving the infrared light emitting diodes 25 to depict alphanumeric characters, even in the form of what is known as scrolling text. The screen 4 and the security camera 2 may be parts of a smartphone or tablet computer that the service personnel uses to detect, analyze and display the light signals from the infrared light emitting diodes 25.

In order that unambiguous and easy-to-detect symbols can be depicted by the infrared light emitting diodes 25 arranged on the support 29, a mask 30 is assigned to the infrared light emitting diodes 25 and/or the support 29, which mask comprises slit-shaped apertures to provide a 7-segment display 32. The 7-segment display 32 can obviously comprise a single digit or multiple digits, i.e. can be designed to depict one or more characters. The infrared light emitting diodes 25 are driven by the play control unit 12 such that they light from behind defined apertures 31 in the mask 30 in order to indicate by means of suitably associated characters the required information in a form that can be detected by the security camera 2 and can be displayed on the screen 4 connected thereto. Of course in this embodiment it is also possible to display information in coded form or in plain text, including as scrolling text.

Figure 5:
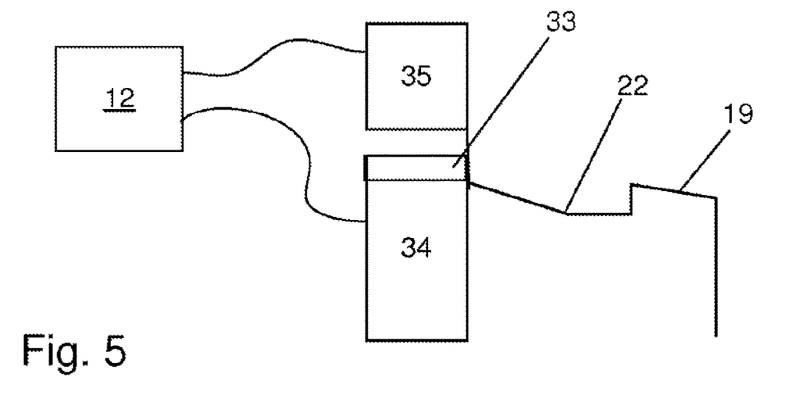
FIG. 5 is a highly simplified schematic side view of the detail V in FIG. 1 in an alternative embodiment.

A cover plate that is transparent to infrared radiation and can be built into the head piece 6 is provided for concealed positioning of the infrared light emitting diodes 25, in other words positioning where it is not visible to the user.

Figure 6:
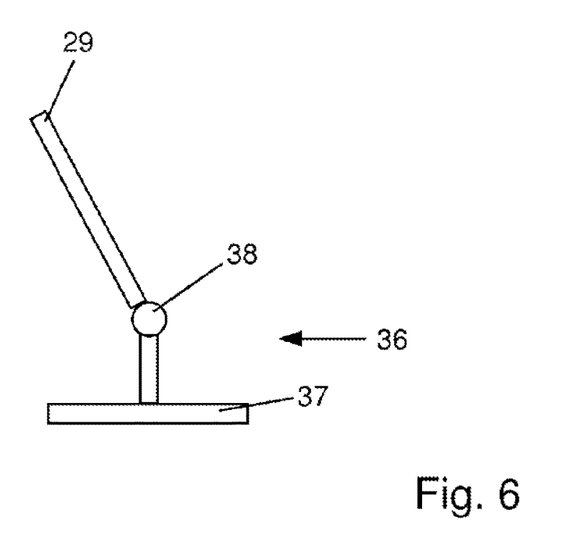
FIG. 6 is a schematic diagram of a mount for components of the monitoring system.

Alternatively, the support 29 having the infrared light emitting diodes 25 arranged thereon, can be connected to a mount 36, which comprises a base 37 for fixing to the floor-standing enclosure 5 of the amusement machine 1, and an adjustable joint 38 for orienting the support 29, i.e. the infrared light emitting diodes 25 arranged thereon, with respect to the security camera 2. A cover plate that is transparent to infrared radiation can again be arranged on the mount 36 or the support 29.

If the coin box of the amusement machine 1 is full, for example, and must be emptied, or the coin payout unit is empty and must be filled, then suitable signals are applied to the play control unit 12, which in turn drives the at least one infrared light emitting diode 25 such that it emits light in a particular manner. An image analysis unit assigned to the processor 3 analyzes the image, which is captured by the security camera 3 and supplied to the processor 3, in terms of the light point or the pattern of light points from the infrared light emitting diodes 25 stimulated to emit light by the play control unit 12, and displays a corresponding piece of information for the service personnel on the screen 4 coupled to the processor 3. The service personnel are hence able to rectify the identified fault in the amusement machine 1 concerned, and can schedule this action so that a player is not disturbed. The images captured by the security camera can be stored by the memory unit 26 for later analysis. In order to simplify the association of the stored image data with specific signaled events, a time stamp can be stored, wherein the relevant timing data such as time and/or date of the recording of the image data originates from a timer in the security camera 2 or in the processor 3.

In addition, the infrared light emitting diodes 25 signal if an unusual, i.e. irregular or abnormal, state arises in the money processing unit 27 connected to the play control unit 12 that infers tampering. This is the case, for instance, if coins or banknotes or similar payment means come to be paid in in a relatively large quantity. Operating the refund button 14 connected to the play control unit 12 or one of the pushbuttons 20 likewise connected to the play control unit 12 can also be displayed on the screen 4 by appropriately controlled activation of the infrared light emitting diodes 25. Furthermore, a front cover 17 that is not closed properly, for example, constitutes an unwanted situation, which is detected by the switch 28 connected to the play control unit 12 and is depicted by the infrared light emitting diodes 25.

Likewise, the contents level of the ticket store 34 can be signaled, for instance if it needs emptying, or a state of the ticket printer 35 can be indicated, for example if a supply of paper has reached a minimum and the service personnel must intervene to ensure smooth operation of the amusement machine 1.

It is also possible to provide information about specific play statuses. For example, if a gambling game or special game or the like is allowed or is running, the play control unit 12, which receives this information, can drive the infrared light emitting diodes 25 in a suitable manner to notify the service personnel watching the relevant screen 4.

LIST OF REFERENCES 1 amusement machine
2 security camera
3 processor
4 screen
5 floor-standing enclosure
6 head piece
7 frame piece
8 side wall
9 frame
10 base
11 cover panel
12 play control unit
13 coin slot
14 refund button
15 base plate
16 foot rest
17 front cover
18 screen
19 console
20 pushbutton
21 control
22 money output tray
23 slot
24 banknote input/output tray
25 infrared light emitting diode
26 memory unit
27 money processing unit
28 switch
29 support
30 mask
31 aperture
32 7-segment display
33 ticket reader
34 ticker store
35 ticket printer
36 mount
37 base
38 joint

The invention claimed is:

1. A monitoring system for an amusement machine having an enclosure, the monitoring system comprising:
a security camera;
an image analysis unit; and
a computer-controlled play control unit, wherein the play control unit is connected to a display device for displaying a game play, at least one actuator allocated to the enclosure and which is configured to output signal information sent by the play control unit, wherein signals from said actuator, which is embodied as an infrared light emitting diode are detected by the security camera, and the play control unit is configured to drive the infrared light emitting diode such that coding configured to signal a plurality of different machine states is provided, and wherein the image analysis unit analyzes an image, which is detected by the security camera, for the presence of a signal from the infrared light emitting diode, and detects and processes the signal from the infrared light emitting diode which determines a machine state.

2. The monitoring system as claimed in claim 1, wherein the at least one actuator comprises a plurality of infrared light emitting diodes, which are arranged in an array and configured to be driven individually.

3. The monitoring system as claimed in claim 2, wherein at least one mask is assigned to the infrared light emitting diodes in order to provide a 7-segment display.

4. The monitoring system as claimed in claim 1, wherein the at least one infrared light emitting diode indicates at least a maximum contents level or minimum contents level of a cash box and/or of a payout unit and/or a cluster of certain games and/or a defined keystroke and/or a specific touchscreen operation and/or a status of a money processing unit and/or a contents level of a ticket store and/or a contents level of a ticket printer and/or a fault with these units.

5. The monitoring system as claimed in claim 1, wherein a machine door of the amusement machine is allocated a switch (28) for detecting the closure state of the machine door, and/or the enclosure is allocated a vibration sensor, which switch and/or vibration sensor is connected to the play control unit, and the play control unit indicates a signal change by driving the at least one infrared light emitting diode suitably.

6. The monitoring system as claimed in claim 1, wherein the at least one infrared light emitting diode is configured to be driven such that coding is provided by the light intensity and/or light frequency of said light emitting diode.

7. The monitoring system as claimed in claim 1, wherein the at least one infrared light emitting diode is mounted on the amusement machine such that it is concealed by a cover plate.

8. The monitoring system as claimed in claim 1, wherein the at least one infrared light emitting diode is assigned to a mount that is fixed to the enclosure such that its orientation can be adjusted.

9. The monitoring system as claimed in claim 1, wherein the monitoring system further comprises a screen coupled to the security camera.

10. The monitoring system as claimed in claim 9, wherein the security camera and the screen are parts of a mobile device or are separate components.

11. The monitoring system as claimed in claim 9, wherein the monitoring system further comprises a processor and an alarm unit, wherein the image analysis unit analyzes the image, which is detected by the security camera and transmitted to the processor, for the presence of a signal from the at least one infrared light emitting diode, and when a signal is identified, the processor actuates the alarm unit that is configured to be discerned by surveillance personnel.

12. The monitoring system as claimed in claim 11, wherein a memory unit connected to the security camera and/or to the processor stores image data from the security camera.

13. The monitoring system as claimed in claim 12, wherein the memory unit stores the image data with an allocated time stamp, wherein a timer is assigned to the security camera and/or to the processor.

14. The monitoring system as claimed in claim 12, wherein the alarm unit is actuated and/or the image data is stored on the basis of a change in the signal from the at least one infrared light emitting diode, which change is ascertained by analysis means of the processor, said analysis means being in the form of a hardware circuit or a software module.

15. The monitoring system as claimed in claim 11, wherein the alarm unit comprises a personal information device.

16. A monitoring system for an amusement machine having an enclosure, the monitoring system comprising:
a security camera;
an image analysis unit; and
a computer-controlled play control unit, wherein the play control unit is connected to a display device for displaying a game play, at least one actuator allocated to the enclosure and which is configured to output signal information sent by the play control unit,
wherein signals from said actuator, which is embodied as an infrared light emitting diode are detected by the security camera, and the play control unit is configured to drive the infrared light emitting diode to signal a plurality of different machine states, wherein the image analysis unit analyzes an image, which is detected by the security camera, for the presence of a signal from the infrared light emitting diode, and detects and processes the signal from the infrared light emitting diode, and wherein the at least one infrared light emitting diode indicates one or more machine states selected from a list comprising:
a maximum contents level or minimum contents level of a cash box, a payout unit, a cluster of certain games, a defined keystroke, a specific touchscreen operation, a status of a money processing unit, a contents level of a ticket store, a contents level of a ticket printer, and a fault with the money processing unit, ticket store, or ticket printer units.

17. A monitoring system for an amusement machine having an enclosure, the monitoring system comprising:
a security camera;
an image analysis unit; and
a computer-controlled play control unit, wherein the play control unit is connected to a display device for displaying a game play, at least one actuator allocated to the enclosure and which is configured to output signal information sent by the play control unit,
wherein signals from said actuator, which is embodied as an infrared light emitting diode are detected by the security camera, and the play control unit is configured to drive the infrared light emitting diode to signal a plurality of different machine states, wherein the image analysis unit analyzes an image, which is detected by the security camera, for the presence of a signal from the infrared light emitting diode, and detects and processes the signal from the infrared light emitting diode, and wherein the amusement machine includes at least one of: a switch connected to the play control unit for detecting the closure state of a machine door of the amusement machine, and a vibration sensor attached to the enclosure and connected to the play control unit; and wherein the play control unit indicates a signal change by driving the at least one infrared light emitting diode.

18. The monitoring system as claimed in claim 17, wherein the at least one infrared light emitting diode is configured to be driven such that coding is provided by the light intensity and/or light frequency of said light emitting diode.

\* \* \* \* \*